United States Patent
Madsen et al.

(10) Patent No.: US 12,069,567 B2
(45) Date of Patent: Aug. 20, 2024

(54) WIDEBAND NETWORK SCANNING AND SPECTRAL ANALYSIS

(71) Applicant: Epiq Solutions, Schaumburg, IL (US)

(72) Inventors: Aaron Madsen, Schaumburg, IL (US); Greg Bujalski, Schaumburg, IL (US); Bryan Nollett, Schaumburg, IL (US)

(73) Assignee: Epiq Solutions, Schaumburg, IL (US)

( * ) Notice: Subject to any disclaimer, the term of this patent is extended or adjusted under 35 U.S.C. 154(b) by 308 days.

(21) Appl. No.: 17/567,597

(22) Filed: Jan. 3, 2022

(65) Prior Publication Data
US 2023/0217352 A1     Jul. 6, 2023

(51) Int. Cl.
*H04W 48/16*      (2009.01)

(52) U.S. Cl.
CPC .................. *H04W 48/16* (2013.01)

(58) Field of Classification Search
CPC .................................................. H04W 48/16
See application file for complete search history.

(56) References Cited

U.S. PATENT DOCUMENTS

| | | | | |
|---|---|---|---|---|
| 6,018,312 | A * | 1/2000 | Haworth | G01S 5/06 342/353 |
| 2007/0098089 | A1 * | 5/2007 | Li | H03J 1/0091 348/E5.097 |
| 2013/0268979 | A1 * | 10/2013 | Pullela | H04N 21/4381 725/68 |
| 2018/0091336 | A1 * | 3/2018 | Mody | H04L 27/0006 |
| 2023/0052023 | A1 * | 2/2023 | Chen | H04L 41/22 |

* cited by examiner

*Primary Examiner* — Junpeng Chen
(74) *Attorney, Agent, or Firm* — McAndrews, Held & Malloy, Ltd.

(57) ABSTRACT

Fast network scanning is enabled by an accessory for a mobile phone. The accessory captures a wideband spectrum via a software defined radio that is independent of the mobile phone itself. The accessory consumes less than 3 W while verifying multiple base stations, of various standards, in an area. To achieve such a low power consumption, the accessory dynamically controls frequency, gain and bandwidth according to a prioritization of processing threads and a target scanning speed.

20 Claims, 11 Drawing Sheets

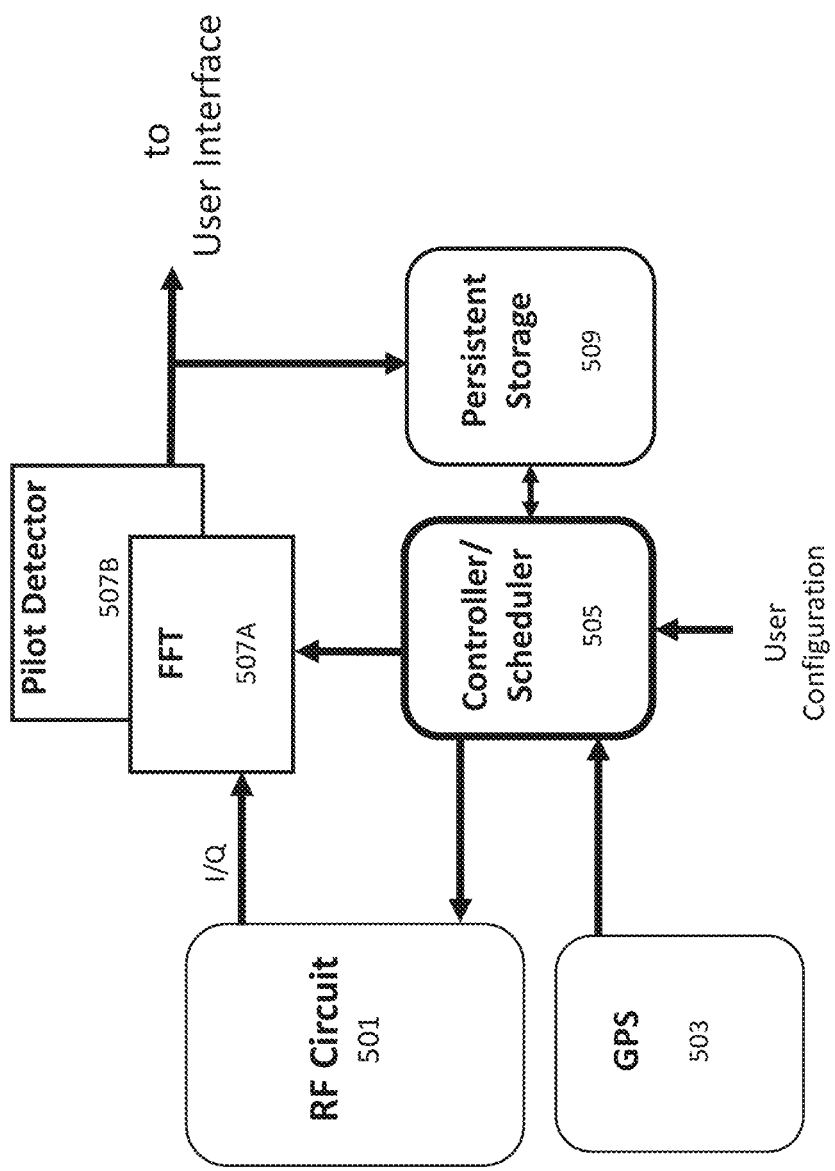

WIDEBAND NETWORK SCANNING AND SPECTRAL ANALYSIS

BACKGROUND

Limitations and disadvantages of conventional methods and systems for scanning and spectrum analyzing will become apparent to one of skill in the art, through comparison of such approaches with some aspects of the present method and system set forth in the remainder of this disclosure with reference to the drawings.

BRIEF SUMMARY

Methods and systems are provided for wideband network scanning and spectral analysis, substantially as illustrated by and/or described in connection with at least one of the figures, as set forth more completely in the claims.

BRIEF DESCRIPTION OF THE DRAWINGS

FIG. 6B illustrates a second example configuration of a network sensor in accordance with various example implementations of this disclosure.

DETAILED DESCRIPTION

Figure 1:
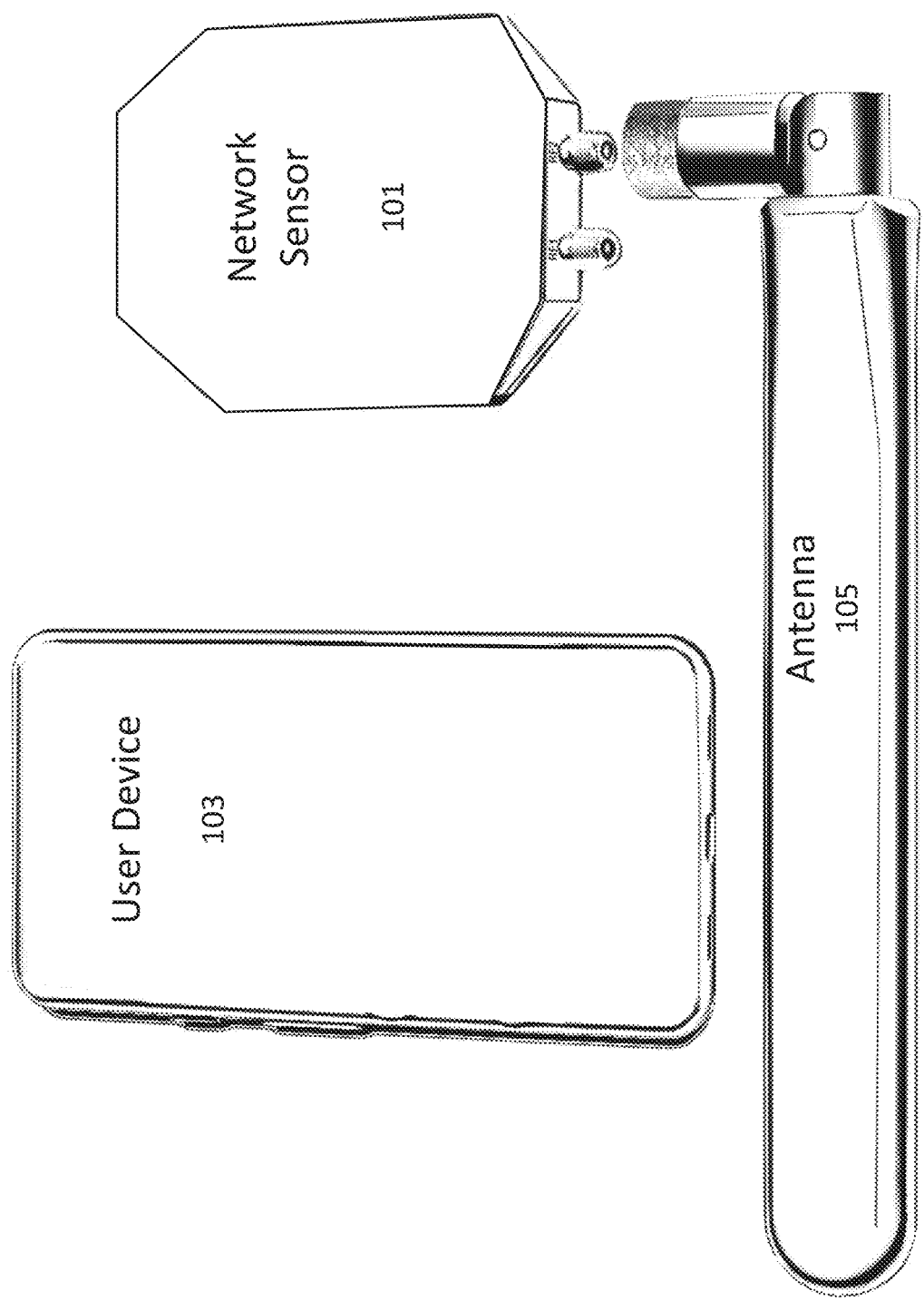
FIG. 1 illustrates an example system for wideband network scanning and spectral analysis in accordance with various example implementations of this disclosure.

FIG. 1 illustrates an example system for wideband network scanning and spectral analysis in accordance with various example implementations of this disclosure. The system comprises a network sensor 101, a user device 103 and an antenna.

Cellular systems are deployed in region-specific frequency bands. Each band consists of a channel raster of possible frequencies which can be used. The system may also search out of band or off raster according to alternate user configurations. The system is operable to convert all configurations into a list of frequencies for capture and processing.

The network sensor 101 is a self-contained RF sensing and computing device that is used to make network performance measurements. The network sensor 101 may also be configured to perform a cellular survey to locate which channels in the channel raster are active. The network sensor 101 operates as a stand-alone device, automatically performing RF detection over a user-configurable range of RF frequencies, technologies, networks, and Radio Frequency Channel Numbers (RFCNs, e.g., EARFCN for LTE and NR-ARFCN for NR).

The survey comprises detecting the presence of a technology specific pilot and decoding the associated channel. The number of empty channels is quite large, so rapidly detecting pilots is critical for a rapid survey.

The network sensor 101 may be a batteryless accessory that receives power from the user device 103 via a wired interface (e.g., USB, USB-C) or wirelessly via induction. Alternatively, the network sensor 101 may be self-powered with its own battery. The user device 103 provides a user interface via any general-purpose mobile computing device, e.g., smartphone, tablet, or laptop. Data may be transferred between the network sensor 101 and the user device 103 via a wired interface (e.g., USB, USB-C) or wirelessly (e.g., via Bluetooth, WiFi). Alternatively, a user interface may be remote and operated from a distance via a network. The network sensor 101 may also be operated without a user interface, and the results may be retrieved from the network sensor 101 and viewed later.

Figure 2:
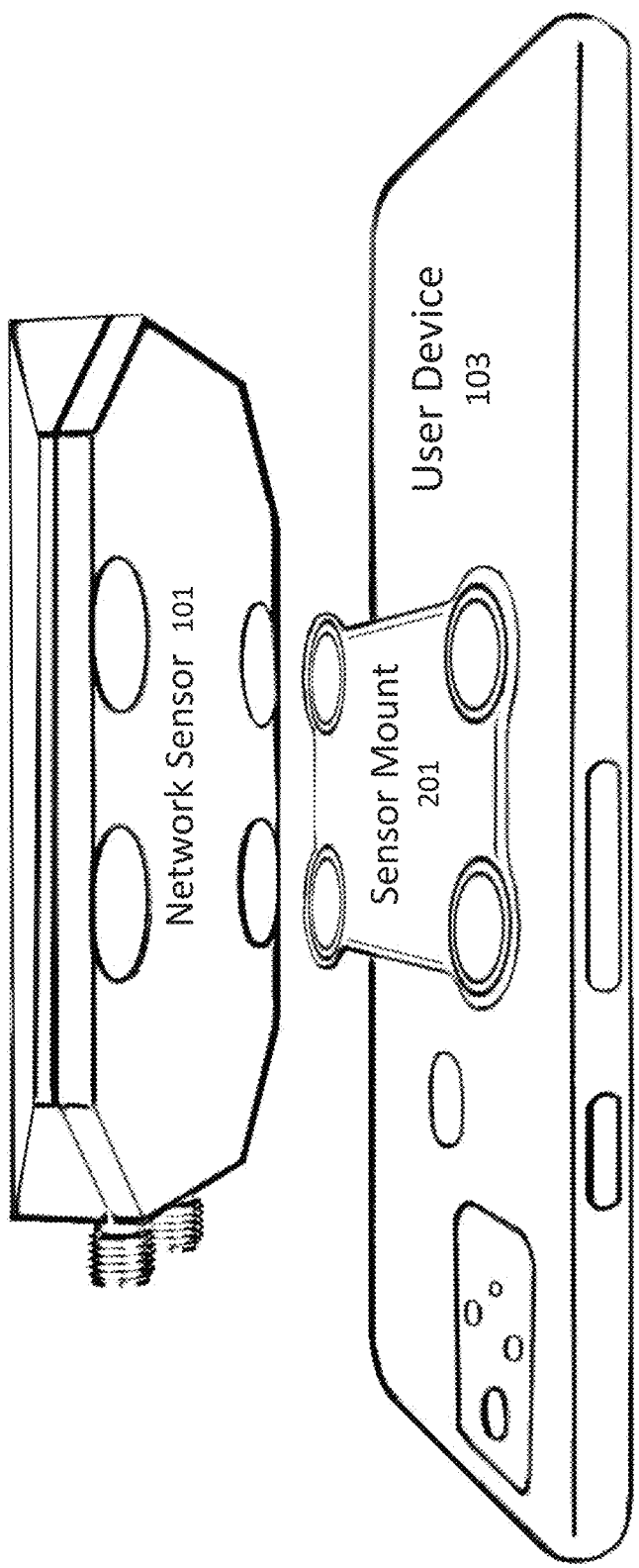
FIG. 2 illustrates an example system for mounting a network sensor to a user device in accordance with various example implementations of this disclosure.

FIG. 2 illustrates an example system for mounting the network sensor 101 to a user device 103 in accordance with various example implementations of this disclosure. As illustrated, a sensor mount 201 may be adhesively attached to the user device 103. The sensor mount 201 and/or the network sensor 101 may comprise magnets to secure the mounting. Other methods of mounting may also be used. For example, the network sensor 101 may be part of a case for the user device 103, thereby providing drop protection as well as a compact overall system.

Figure 3:
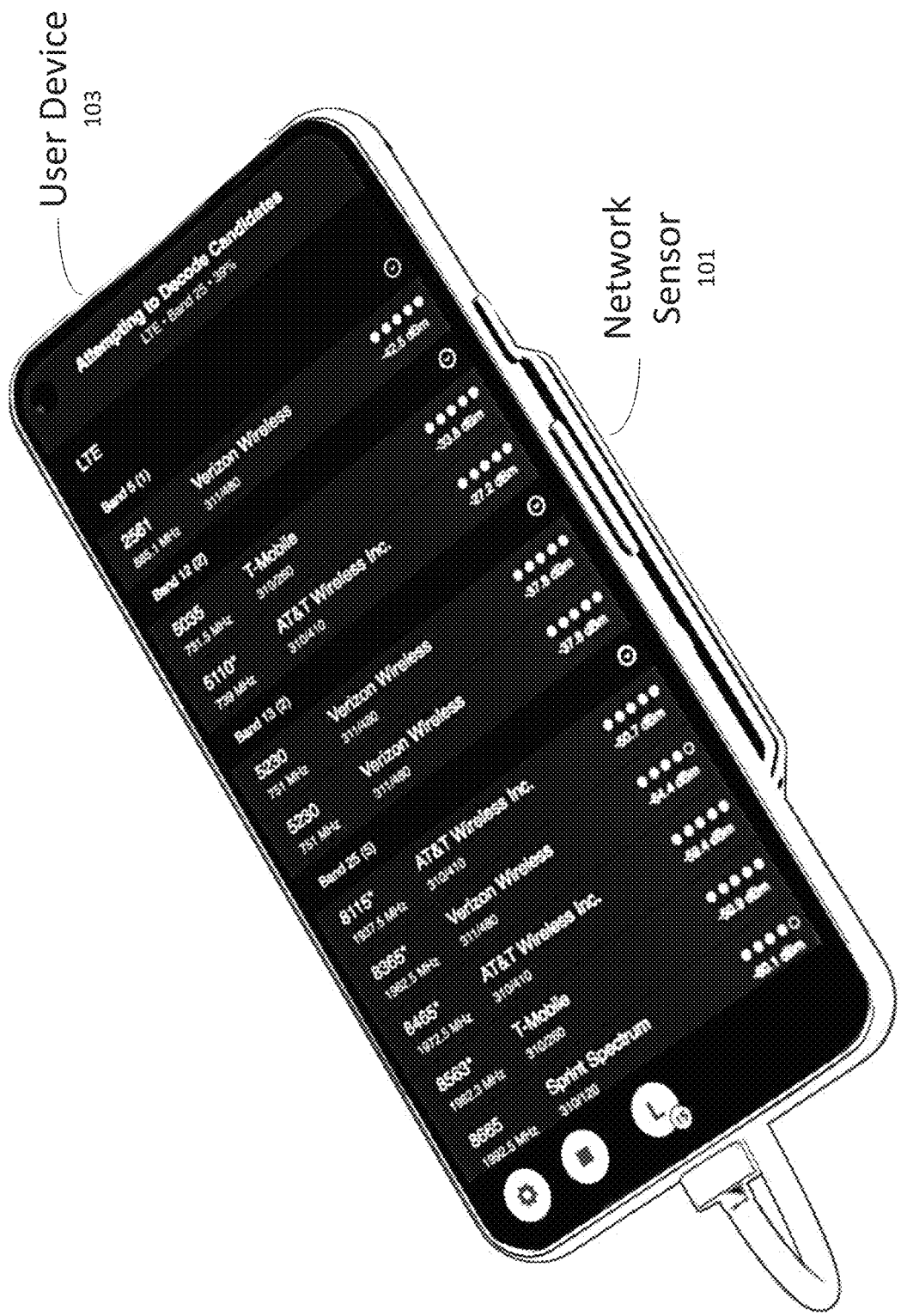
FIG. 3 illustrates an example user interface for network scanning in accordance with various example implementations of this disclosure.

FIG. 3 illustrates an example user interface for network scanning in accordance with various example implementations of this disclosure. The network sensor 101 may be configured for RF measurements over a wide range of frequencies. For example, a range of frequencies between 70 MHz and 6 GHz may be used to cover the 700/800 MHz public safety bands, and cellular bands including (but not limited to) FirstNet LTE, VHF, UHF, P25, LTE and 5G NR. The network sensor 101 makes its measurements based on a decoded downlink channel on these network types. The decoded parameters, such as band, channel ID, carrier frequency, service provider and signal strength, are displayed on the user device 103.

Figure 4:
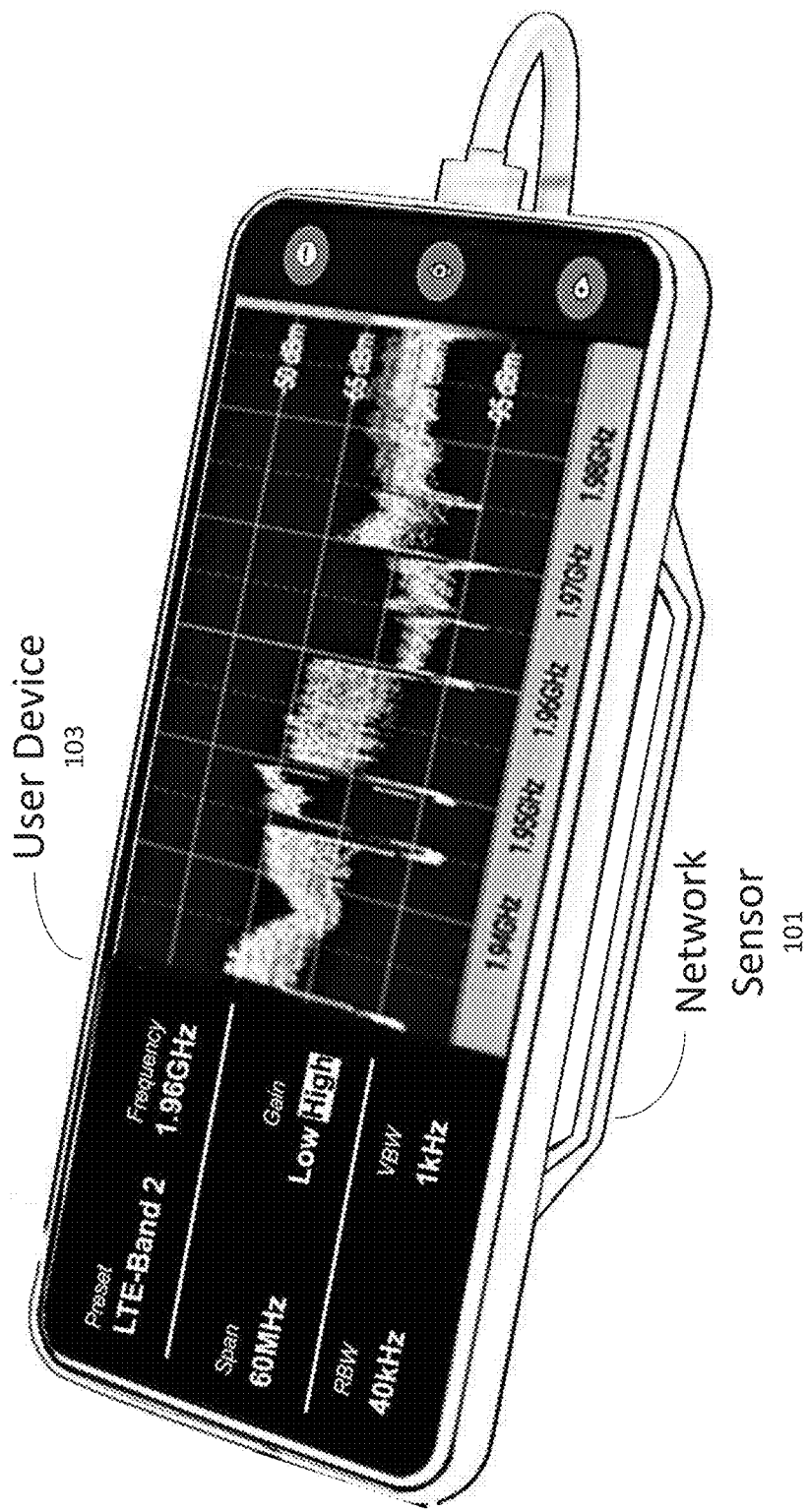
FIG. 4 illustrates an example user interface for spectral analysis in accordance with various example implementations of this disclosure.

FIG. 4 illustrates an example user interface for spectral analysis in accordance with various example implementations of this disclosure. The network sensor 101 is configured to transfer a frequency spectrum to the user device 103 for display. In this example, a 60 MHz span of the 1.96 GHz LTE band is displayed.

Figure 5:
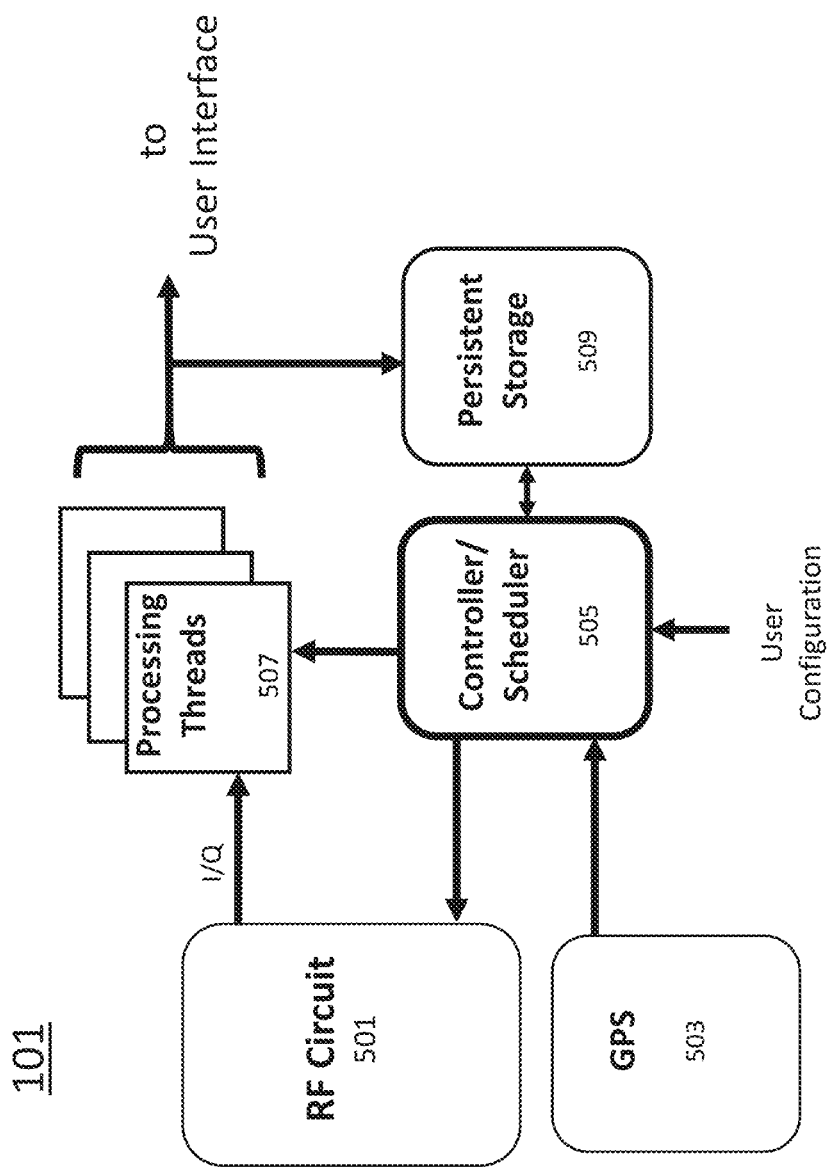
FIG. 5 illustrates the circuitry of an example network sensor in accordance with various example implementations of this disclosure.

FIG. 5 illustrates the circuitry of an example network sensor 101 in accordance with various example implementations of this disclosure. The network sensor 101 comprises an RF circuit 501, a GPS circuit 503, a controller/scheduler 505, a plurality of processing threads 507, and persistent storage 509.

The controller/scheduler 505 is configured to manage the number of candidate channels being processed by the processing threads 507 according to a maximum power consumption level (e.g., 3 W) of the entire network sensor 101.

The scheduler 505 and the processing threads 507 may comprise one or more application specific integrated circuits (ASICs), one or more field programmable gate arrays (FPGAs), and/or one or more processors (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

The scheduler 505 manages the tradeoffs between one or more of the following objectives: 1) minimizing user effort, 2) minimizing the time for the detection of cells, 3) providing rapid physical measurements on detected cells (e.g., 10+ measurements/sec or as configured by the user), and 4) minimizing power consumption. According to the desired objectives, the scheduler 505 dynamically selects which actions to perform on what bands, channels and cells, and may adjust detection thresholds, time between measurements, and other selection criteria to optimize performance. The scheduler 505 may also adjust a time "knob" that sets a threshold for the number of false positives during pilot detection.

The scheduler 505 objectives may vary according to the use case. Use cases include (but are not limited to): 1) a known network drive test, in which specific known channels are monitored, 2) a blind drive test (in which unknown channels detected, decoded and monitored), and 3) a stationary test with minimal configuration and fast physical measurements.

The user configuration may be converted into a list of entries in a set of queues. Each scan cycle consists of processing all of the entries until the queues are empty, at which point the cycle begins again. The scheduler 505 is responsible for determining the order in which the entries are processed to match the use case. The factors used to determine which entry runs next include (but are not limited to): 1) the type of entry (e.g., band, channel, cell), 2) the type of action (e.g., detecting, decoding, physical layer measurements), 3) the time since an action has last been performed on a particular entry, 4) the distance moved since an action has last been performed on a particular entry, 5) the success or failure of action last attempted on a particular entry, 6) the impact of the use case on timing, 7) the system loading, 8) memory availability, 9) the number of radios in the RF circuit 501, 10) the number of technologies that are being simultaneously surveyed (e.g., LTE, 5GNR, etc.), and 11) a change in position as determined via the GPS circuit 503.

The scheduler 505 takes advantage of the fact that after the first detection and decode, information is known about the timing and configuration of the cell that can reduce effort and change what needs to be done in future passes. For example, if a cell was just decoded, the same cell will not be decoded again immediately, but a physical layer measurement can be updated, thereby reducing power consumption and processing requirements for full decode.

The scheduler 505 may control multiple processing threads 507 during RF capture to allow for parallel processing and/or multiple radios in the RF circuit 501. The scheduler 505 may also allow for parallel multi-technology processing from single radio. The scheduler 505 may take advantage of previous results (stored in the persistent memory 509) to reduce the time it takes to achieve a first result and reduce the time it takes for already found channels. The scheduler 505 may intermix blind scan data based on the configuration, refresh of already found channels, and intermix physical layer only measurements to improve the measurement rate.

The scheduler 505 can query a database in the persistent memory 509 for recent channels in configured bands. Based on the recent channels, the scheduler 505 can fill a set of queues with bands, channels, and cells to schedule. These queues are processed by the processing threads 507 as resources permit.

The scheduler 505 is loop-driven by the queues filled by configuration. Queues are processed in order of priority. A queue comprising channels that were recently detected is given a highest priority. A queue comprising channels to be scanned in a configured band is also given a high priority.

The scheduler 505 configures the RF circuit according to what is being performed by the processing threads 507 (e.g., scanning, decoding, etc.) and the observed signal levels for gain.

Figure 6A:
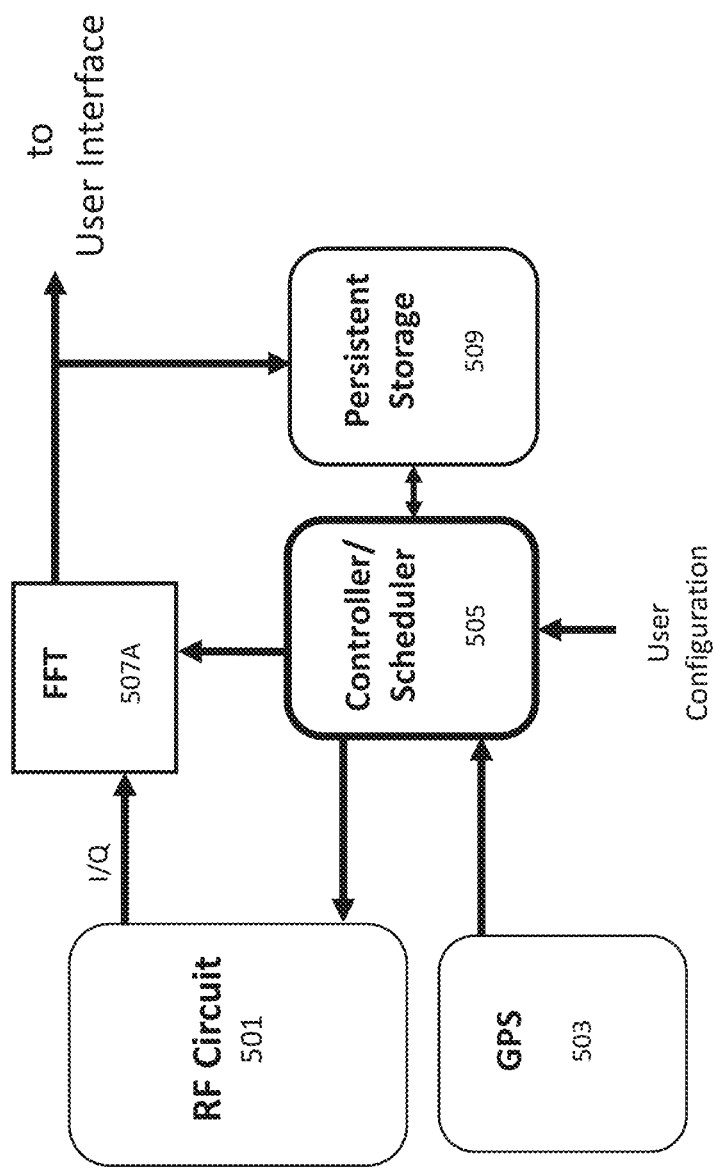
FIG. 6A illustrates a first example configuration of a network sensor in accordance with various example implementations of this disclosure.

FIG. 6A illustrates a first example configuration of a network sensor in accordance with various example implementations of this disclosure. In FIG. 6A, the scheduler 505 coordinates the use of a processing thread for FFT analysis 507A. The output of the FFT circuit 507A may be stored and/or sent to a user device for display as a spectrum as illustrated, for example, in FIG. 4.

FIG. 6B illustrates a second example configuration of a network sensor in accordance with various example implementations of this disclosure. In FIG. 6B, the scheduler 505 coordinates the use of processing threads for FFT analysis 507A and pilot detection 507B.

As in FIG. 6A, the FFT analysis circuit 507A generates a frequency-domain representation of the received I/Q signal. The pilot detection circuit 507B performs a frequency-domain correlation with a known filtered pilot to detect whether a channel is being used. The pilot detection circuit 507B non-coherently accumulates the correlations according to an accumulation rate as set by the scheduler 505. The accumulation rate of the pilot detection circuit 507B controls the number of false positives in a list of candidate channels that may be subsequently decoded. The sample rate of the I/Q signal is determined by the nature of the signal being searched for. The duration of the capture is determined by the repetition rate of the pilot.

For blind scanning, the user doesn't need any prior knowledge of the channels or frequencies. To begin detection, a user configures the technologies and bands of interest, a user can also select all technologies and all bands or narrow it down to specific channels if desired. The pilot detection thread 507B detects signals in a particular geographic area and provides details about the received signals. The pilot detection thread 507B provides rapid channel measurements for accurate assessment of signal strength and quality metrics for all received cells and beams. These measurements along with time stamps, metadata and location can be exported in CSV format for post processing.

Figure 6C:
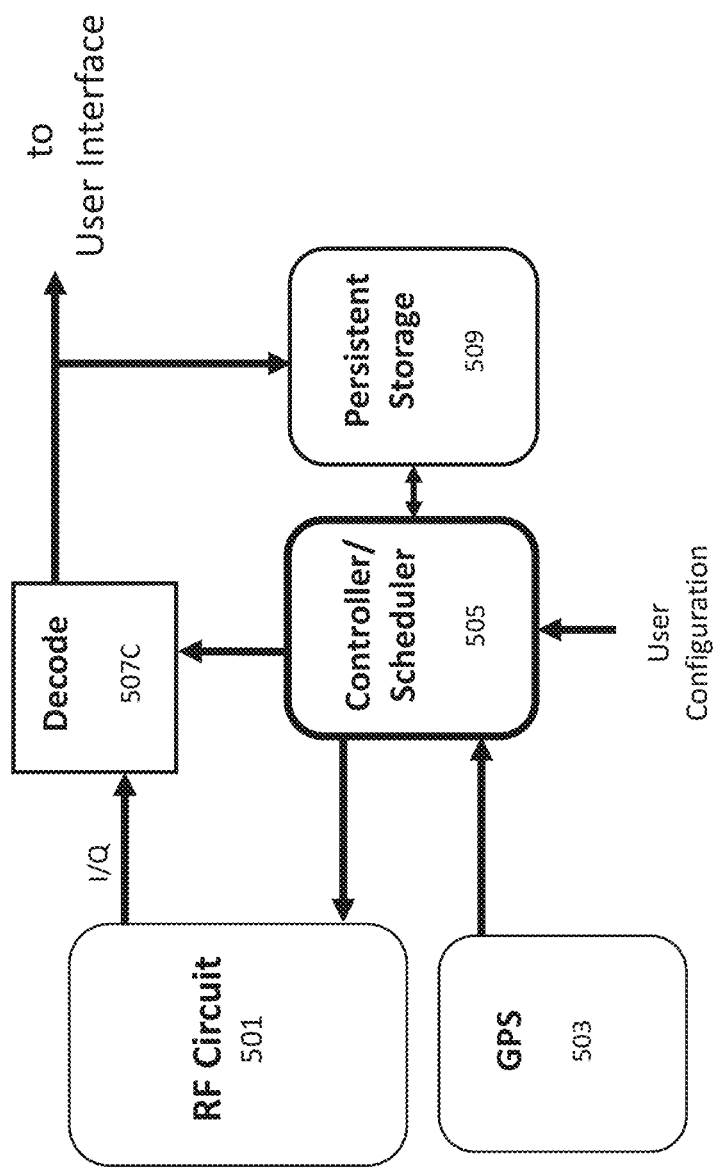
FIG. 6C illustrates a third example configuration of a network sensor in accordance with various example implementations of this disclosure.

FIG. 6C illustrates a third example configuration of a network sensor in accordance with various example implementations of this disclosure. In FIG. 6C, a processing thread for channel decoding 507C is selected by the scheduler 505.

Figure 6D:
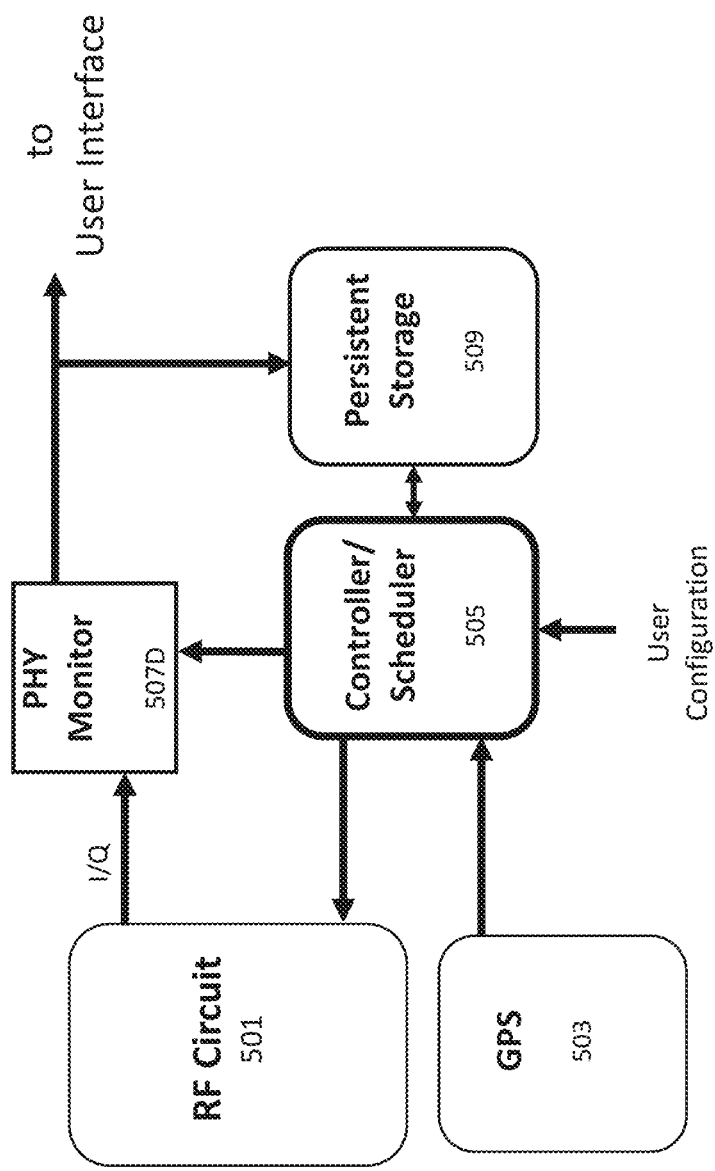
FIG. 6D illustrates a fourth example configuration of a network sensor in accordance with various example implementations of this disclosure.

FIG. 6D illustrates a fourth example configuration of a network sensor in accordance with various example implementations of this disclosure. In FIG. 6D, a processing thread for physical layer measurement monitoring 507D is selected by the scheduler 505. Physical layer measurements may be prioritized for when radio is free, i.e., after all cells in a queue are detected. When queues are empty, the process repeats.

Figure 7:
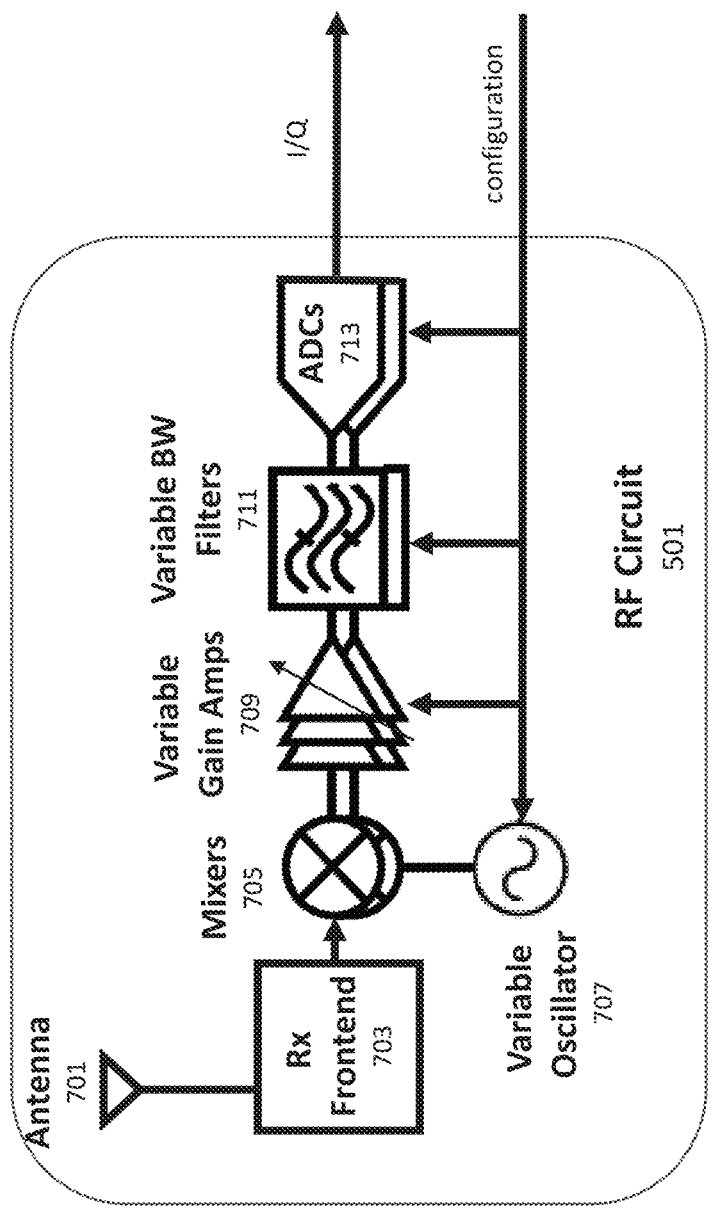
FIG. 7 illustrates an example RF circuit in a network sensor in accordance with various example implementations of this disclosure.

FIG. 7 illustrates an example RF circuit in a network sensor in accordance with various example implementations of this disclosure. The RF circuit 501 may be implemented as an integrated circuit comprising one or mixers 705, one or more variable gain amplifiers (VGAs) 709, one or more variable bandwidth bandpass filters (BPFs) 711 and one or more analog-to-digital converters (ADCs) 713. The RF circuit 501 may be configured as a single radio receiving one wideband signal or as a plurality of radios receiving a plurality of independently controlled wideband signals. The mixers 705 may be coupled to a receiver frontend 703 comprising an interface to one or more antennas 701. The antennas 701 may comprise an internal or an external antenna (as illustrated in FIG. 1). The mixers 705 are operably coupled to one or more voltage controlled oscillators (VCOs) 703.

The VCOs 703, VGAs 709, BPFs 711 and ADCs 713 are dynamically controlled by the scheduler/controller 505 (as described in reference to FIG. 5). For I/Q sample capture, the scheduler/controller 505 maintains a history of recent frequency values for the VCOs 707, recent gain values for the VGAs 709, recent bandwidth values for the BPFs 711 and recent sample rates for the ADCs 713.

The frequency of the VCOs 707, the gain of the VGAs 709, the bandwidth of the BPFs 711, and the sample rate of the ADCs 713 are configured to receive a raster of channels.

Figure 8:
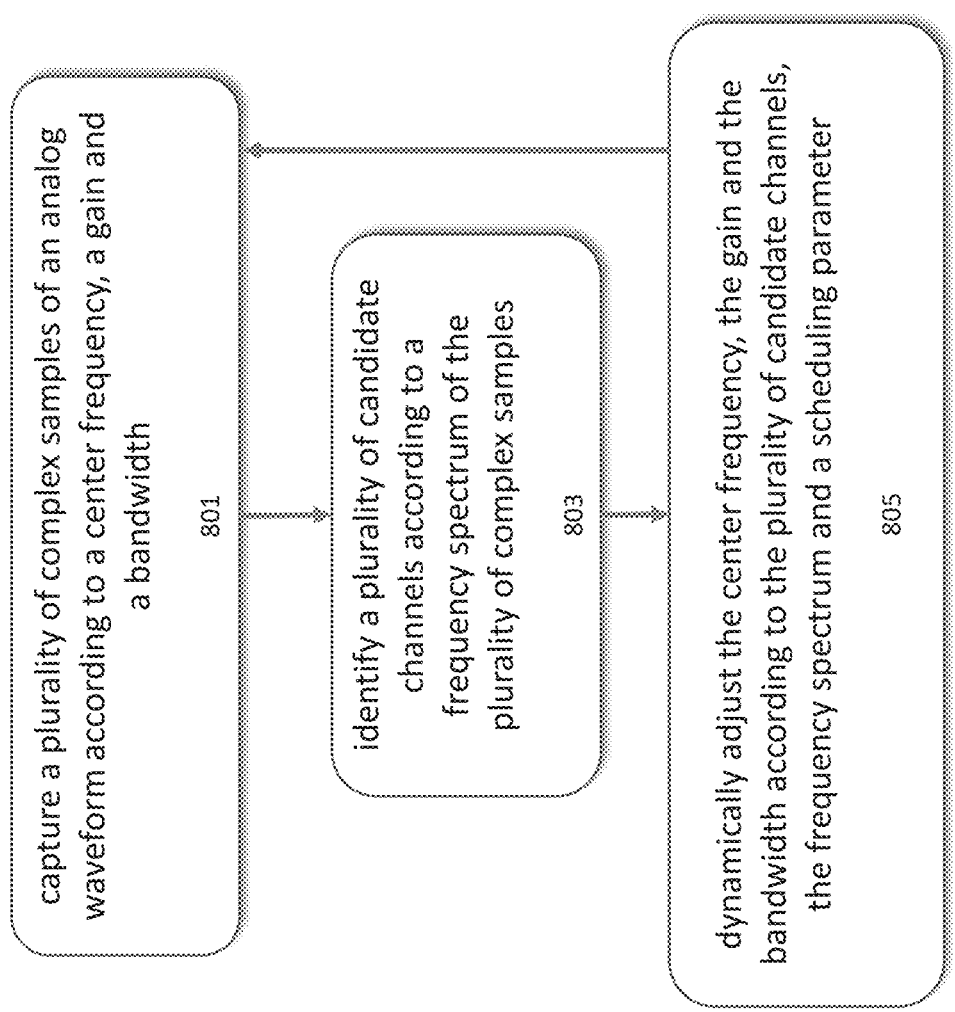
FIG. 8 illustrates a flowchart of a method for wideband network scanning and spectral analysis in accordance with various example implementations of this disclosure.

FIG. 8 illustrates a flowchart of a method for wideband network scanning and spectral analysis in accordance with various example implementations of this disclosure. The method begins, at 801, with capturing a plurality of complex samples of an analog waveform according to a center frequency, a gain and a bandwidth. At 803, a plurality of candidate channels are identified according to a frequency spectrum of the plurality of complex samples. The identifying comprises blind scanning of a cell band channel to determine a cell identity of a local base station. The identification may be based on a measurement of a signal strength, associated with a particular candidate channel, as compared to a signal strength associated with a relative noise level.

The center frequency, the gain and the bandwidth are dynamically adjusted, at 805, according to the plurality of candidate channels, the frequency spectrum of the plurality of complex samples and a scheduling parameter. The scheduling parameter is associated with a threshold number of candidate channels allowable according to a maximum power consumption level (e.g., 3 W) of the network sensor.

The term "band" refers to a set of channels grouped by specification. The term "channel" refers to a single frequency, which may have multiple cells. The term "cell" refers to a single cellular base station. The term "beam" refers to a directional transmission from a cell. The term "configuration" refers to a list of desired bands and channels to survey/measure. A "configuration" can be sub-specified as to what to do (what to decode/what to measure). The term "detection" refers to a determination that one or more cells is present on a channel. The term "decoding" refers to recovering the broadcast signals transmitted by a cell. The term "physical measurement" refers to signal quality and other measurements made on a cell. The term "scan cycle" refers to a single pass through the user configuration.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
a wideband capture device configured to generate a plurality of complex samples of an analog waveform according to a center frequency, a gain and a bandwidth;
a scanner configured to identify a plurality of candidate channels according to a frequency spectrum of the plurality of complex samples; and
a spectral analysis device operable to dynamically adjust the center frequency, the gain and the bandwidth according to the plurality of candidate channels, the frequency spectrum of the plurality of complex samples and a scheduling parameter, wherein the scheduling parameter is associated with a threshold number of candidate channels allowable according to a maximum power consumption level.

2. The system of claim 1, wherein:
the scanner is configured to generate a measurement associated with the plurality of candidate channels.

3. The system of claim 1, wherein:
the system is a batteryless accessory for a mobile device.

4. The system of claim 1, wherein:
the wideband capture device comprises two independent radios.

5. The system of claim 1, wherein:
the system is mounted on a mobile device.

6. The system of claim 1, wherein:
the scanner is configured to communicate a measurement to a mobile device.

7. The system of claim 1, wherein:
the wideband capture device, the scanner and the spectral analysis device, together, consume less than 3 W of power when active.

8. The system of claim 1, wherein:
the scanner is configured to perform blind scanning of a cell band channel to determine a cell identity of a local base station.

9. The system of claim 1, wherein:
the system is configured to transfer a frequency spectrum to a mobile device via one of a USB and a Bluetooth protocol.

10. The system of claim 1, wherein:
the system comprises a decoder configured to decode one or more of the plurality of candidate channels to verify a base station parameter.

11. A method comprising:
capturing a plurality of complex samples of an analog waveform according to a center frequency, a gain and a bandwidth;
identifying a plurality of candidate channels according to a frequency spectrum of the plurality of complex samples; and
dynamically adjusting the center frequency, the gain and the bandwidth according to the plurality of candidate channels, the frequency spectrum of the plurality of complex samples and a scheduling parameter, wherein the scheduling parameter is associated with a threshold number of candidate channels allowable according to a maximum power consumption level.

12. The method of claim 11, wherein the method comprises:
generating a measurement associated with the plurality of candidate channels.

13. The method of claim 11, wherein:
the method performed by a batteryless accessory for a mobile device.

14. The method of claim 11, wherein:
the method is performed by a system comprising two independent radios.

15. The method of claim 11, wherein:
the method is performed by a system mounted on a mobile device.

16. The method of claim 11, wherein the method comprises:
communicating a measurement, of the frequency spectrum of the plurality of complex samples, to a mobile device.

17. The method of claim 11, wherein:
the capturing, the identifying and the dynamic selecting are performed by a system that consumes less than 3 W of power when active.

18. The method of claim 11, wherein:
the identifying comprises blind scanning of a cell band channel to determine a cell identity of a local base station.

19. The method of claim 11, wherein the method comprises:
transferring a frequency spectrum to a mobile device via one of a USB and a Bluetooth protocol.

20. The method of claim 11, wherein the method comprises:
decoding one or more of the plurality of candidate channels to verify a base station parameter.

* * * * *